July 10, 1945. L. N. SCHWIEN 2,380,079
GYROSCOPIC ANGULAR VELOCITY INDICATOR
Filed Oct. 6, 1943 3 Sheets-Sheet 1

Inventor
LEO NEVIN SCHWIEN,
By

Attorney

July 10, 1945.  L. N. SCHWIEN  2,380,079
GYROSCOPIC ANGULAR VELOCITY INDICATOR
Filed Oct. 6, 1943  3 Sheets-Sheet 2

Inventor:
LEO NEVIN SCHWIEN,
By
Attorney.

July 10, 1945.  L. N. SCHWIEN  2,380,079
GYROSCOPIC ANGULAR VELOCITY INDICATOR
Filed Oct. 6, 1943   3 Sheets-Sheet 3
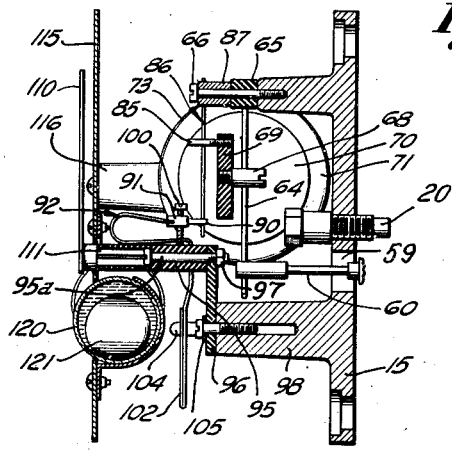
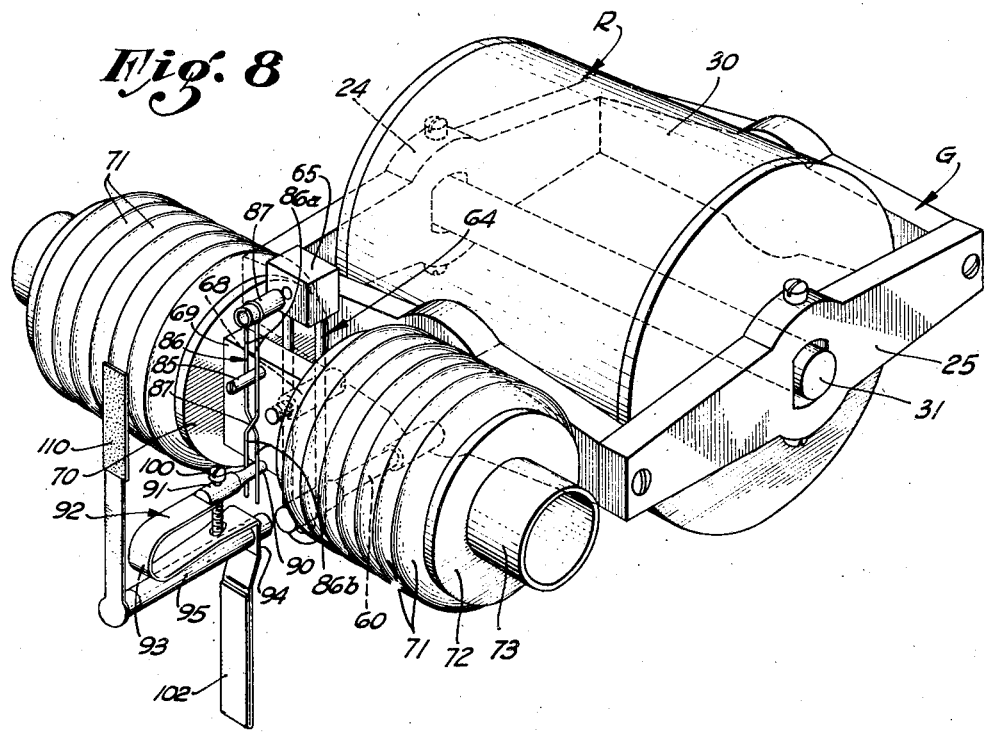
Inventor:
LEO NEVIN SCHWIEN,
By
Attorney.

Patented July 10, 1945

2,380,079

UNITED STATES PATENT OFFICE 2,380,079

GYROSCOPIC ANGULAR VELOCITY INDICATOR

Leo Nevin Schwien, Los Angeles, Calif., assignor to L. N. Schwien Engineering Co., Los Angeles, Calif., a limited partnership composed of Leo Nevin Schwien, Louise Korbel Schwien, Georgia Korbel, Mary Korbel, and Frances Korbel Application October 6, 1943, Serial No. 505,147

14 Claims. (Cl. 33—204)

This invention deals generally with spring restrained gyroscopic angular velocity indicators, such for instance as rate of turn, pitch or roll indicators. The invention will be herein disclosed as embodied in a rate of turn indicator, though without limiting implication.

Such instruments as I have reference to comprise a gyroscope mounted in a gimbal frame on a precession axis which is at right angles to the axis about which angular velocity is to be indicated. When the instrument is given an angular velocity about the latter axis, the gimbal frame tends to "precess" about the precession axis. A centralizing spring means is arranged to oppose this precession, and the angle of precession against the opposition of such spring means, brought to an indication by indicator mechanism and a pointer, becomes a measure of the angular velocity. An essential in any such instrument is a damping means adapted to damp the gimbal frame and indicator mechanism against oscillations.

The general object of the present invention is to provide an improved gyroscopic instrument of the class mentioned, while more particular objects are to provide improved centralizing spring means and improved oscillation damping means in such gyroscopic instruments.

A further object is the provision of improved indicator mechanism.

The present invention provides a damping means in the form of a pair of liquid-containing bellows, interconnected by a restricted port. These bellows are so associated with the indicator mechanism that one is contracted and the other expanded for each excursion of the indicator from its zero position, causing liquid to be forced from the contracted bellows to the expanded bellows through said port. The liquid flow through the restricted port very effectively checks and damps the action, and the pointer of the instrument is virtually "dead beat." The bellows are of a resilient construction, and fulfill the further function of the necessary centralizing springs.

The above and other objects and features will be more fully understood from the following detailed description of a bank and turn indicator forming one typical and illustrative embodiment of the invention.

In the drawings:

Fig. 8 is a somewhat diagrammatic view in perspective of the gyroscope indicator mechanism and bellows; and Fig. 9 is a detail section of the indicator mechanism, being taken in the plane of line 2—2 of Fig. 1.

Figure 1:
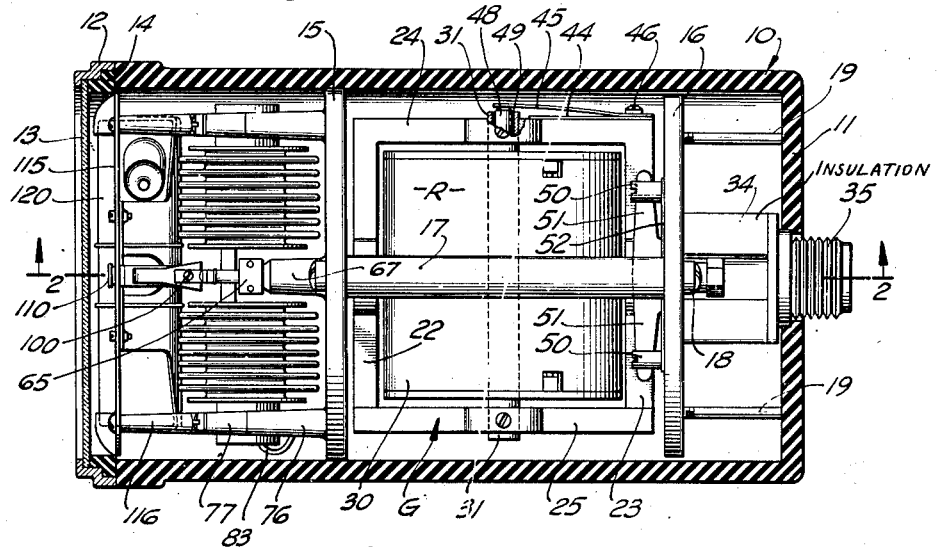
Fig. 1 is a plan view of the illustrative bank and turn indicator, the exterior casing being shown in horizontal longitudinal section.
Figure 2:
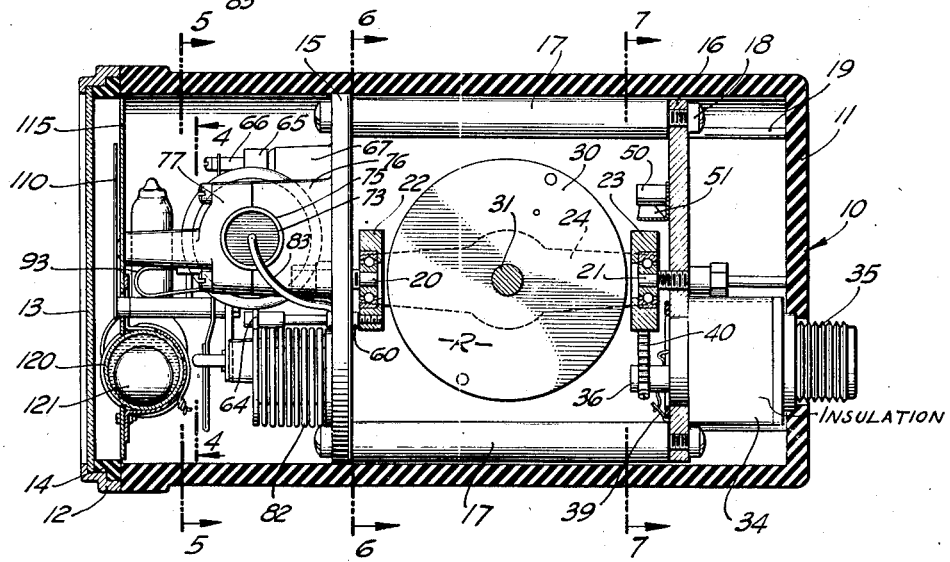
Fig. 2 is a longitudinal vertical section taken about on line 2—2 of Fig. 1, the forward frame plate and parts mounted thereon, however, as well as the gyroscope rotor being shown in elevation.
Figure 2:
Figure 3:
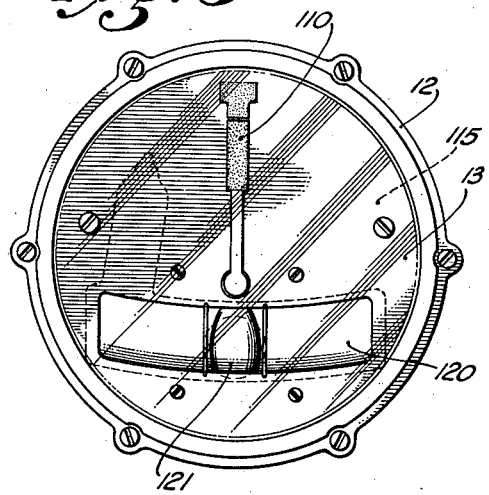
Fig. 3 is a front end elevation of the instrument.
Figure 4:
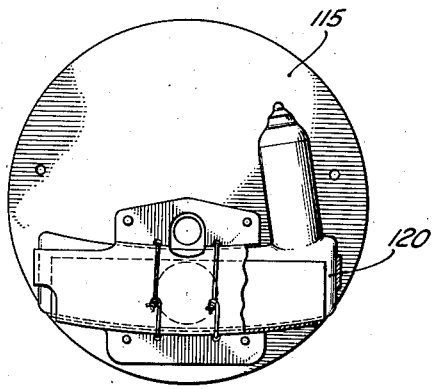
Fig. 4 is a rear face view of the dial and bank indicator carried thereby.
Figure 5:
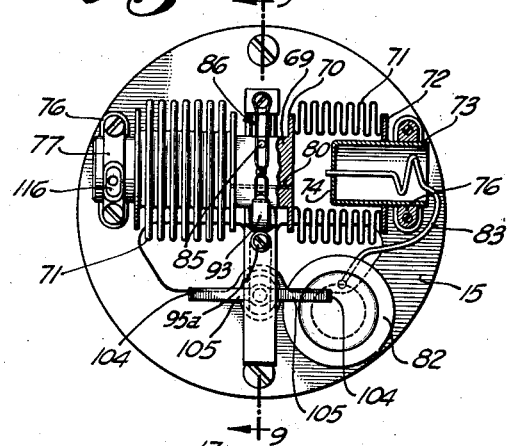
Fig. 5 is a front end view of the instrument, the casing, dial and pointer being removed.
Figure 6:
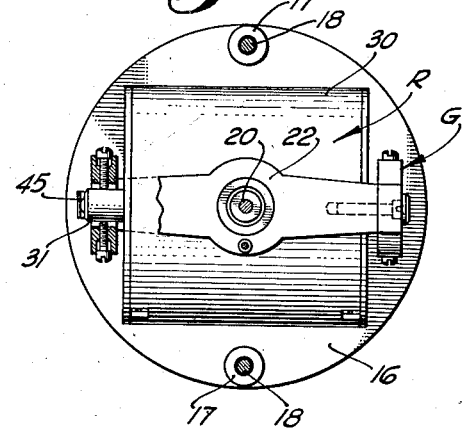
Fig. 6 is a section on line 6—6 of Fig. 2.

In the drawings, numeral 10 designates a cylindrical case having a closed rearward end 11, and to the forward end of which is secured a ring or bezel 12 supporting glass 13 in position against gasket 14. Contained within this case is a frame comprising front and rear circular transversely disposed frame plates 15 and 16, respectively, interconnected by a pair of diametrically opposite posts 17 and screws 18, and positioned by screws 19 reaching inwardly through rear casing wall 11 and threading into rearward frame plate 16. Supported on a horizontal fore and aft precession axis by means of pivots 20 and 21 threaded through the centers of frame plates 15 and 16 are the front and rear bars or end members 22 and 23 of a gimbal ring G, which is completed by side members 24 and 25 secured to the ends of the bars 22 and 23. Mounted for rotation in gimbal ring G, on a normally horizontal axis at right angles to the precession axis, is the gyroscope rotor R. The gyroscope rotor may be of any desired type, electrically driven, air driven, or otherwise, although I prefer the electrically driven type, and have indicated such a type in the drawings. The indicated gyroscope rotor is accordingly to be understood as embodying an electric motor, not shown, enclosed within rotor case 30, and mounted for rotation on an axle 31 tightly mounted in the sides 24 and 25 of gimbal ring G.

Figure 7:
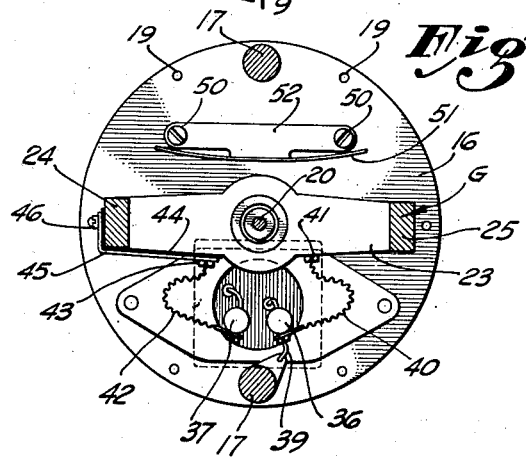
Fig. 7 is a section on line 7—7 of Fig. 2.

Inasmuch as the details of the electric motor form no part of the present invention, and may be of any desired or appropriate type, no illustration thereof is deemed necessary herein. I have, however, illustrated suitable means for conveying electrical current to the interior of casing 30 for use by the motor. Mounted on the rearward frame plate 16 is an insulation block 34 to which is secured a threaded electric socket 35 projecting through rearward casing wall 11 and adapted to receive an electric plug and threaded coupling collar of a conventional type. Terminal posts 36 and 37 (Fig. 7) project from block 34 through an opening in frame plate 16, and will be understood to carry the electrical current supplied by the plug inserted within the socket 35. Post 36 is preferably electrically grounded to the frame by means of connection 39, and is also electrically connected to the gimbal ring by means of a flexible connection 40 and a screw 41 threaded directly into the gimbal ring bar 16 (see Fig. 7). The other terminal post 37 is connected by a similar flexible connection 42 to a screw 43 understood to be threaded into a suitable insulation insert installed in gimbal ring bar 23. Under screw 43 is an insulation strap 44 and an electrically conductive strap 45, which straps extend laterally to the side member 24 of the gimbal ring and thence to the axle of rotor R, a screw 46 preferably being employed to secure the straps to side member 24 and being understood to be threaded into an insulation insert installed in member 24. The end of conductive strap 45 bears on a conductor pin 48 mounted within the hollow end portion of axle 31 and insulated therefrom by means of an insulation bushing 49, it being understood that the pin 48 conveys electrical current to one terminal of the electrical motor contained within casing 30, while the other terminal of said motor is grounded.

Projecting from rearward frame plate 16 are a pair of stop pins 50 adapted to limit rotation of the gimbal ring on the precession axis to a predetermined angle, these pins overlying the rearward bar 23 of the gimbal ring and being engageable thereby to determine the limiting positions, as will be evident. Preferably, a pair of oppositely extending spring arms 51, attached to frame plate 16 through a strap 52 bent at right angles to the arms 51 and secured to plate 16 by the pins 50, are engageable by the gimbal ring just before the stop pins 50 are reached. These spring arms yieldingly oppose the movement of the gimbal ring during the last or outer parts of its movement, and thus bring about a "crowding" of the remote regions of the scale, while permitting a desirable expansion of the more important inner region thereof. The spring arms also have the effect of cushioning the stops.

Projecting forwardly from a point on forward gimbal ring bar 22 located a short distance below pivot 20, and reaching through an opening 59 in frame plate 15, is an actuating pin 60 for the indicator mechanism. This pin engages snugly between the two sides of a loop or link 64 which projects downwardly from a block 65 rotatably mounted on a pivot screw 66 threaded into a boss 67 projecting from frame plate 15. Also snugly received between the two sides of link 64, at a point approximately half way between the actuating pin 60 and the pivot mounting for the link, is a stud 68 which is set into a bridge member 69 positioned forwardly of the link. This bridge member 69 has a disc-like head 70 at each end, and to these heads are secured and hermetically sealed the inner ends of a pair of opposed liquid filled, hermetically sealed metallic bellows 71. The outer ends of the bellows are secured and sealed to end rings 72, which are in turn secured to sealed tubes or sleeves 73 having closed inner ends 74. The tubes 73 engage half-round seats 75 formed on posts 76 projecting from opposite sides of frame plate 15, and are secured in position by straps 77 fastened to the posts 76 by suitable screws as indicated.

From the above description, it will be evident that the movement of actuating pin 60 with precessional movement of the gimbal ring will swing link 64 on its pivot, and that such movement of link 64 will move stud 68 and therefore bridge member 69 to compress one of the bellows and expand the other. Bellows 71 are filled with a slightly viscous fluid, such for instance as alcohol, and this fluid is capable of flowing from one bellows to the other by way of a restricted port or orifice 80 extending through member 69 and opening at its opposite ends inside the two bellows. Thus, contraction of one bellows and expansion of the other forces liquid to flow from the former to the latter, and the movement of the bellows is checked or damped by the restricted orifice.

To assure that the two bellows 71 are filled with liquid at all times, a liquid-filled expansion chamber, preferably in the form of a third hermetically sealed bellows 82 mounted on frame plate 15, is connected with one of the bellows 71 by means of a connecting tube 83.

The turn indicating pointer may, of course, be actuated in any way from the gimbal ring; preferably, however, it is actuated from the member 69 interconnecting the two bellows. Thus, as here shown, a pin 85 projecting forwardly from the member 69 engages between the two sides of a crossed fork member 86 formed from a somewhat light and resilient wire. This wire is looped over and secured to a sleeve or hub 87 rotatably mounted on the aforementioned pivot screw 66. In the preferred embodiment, the fork member 86 has two parallel upper side portions 86a (see Fig. 8) in snug engagement with opposite sides of the pin 85, and the two sides are crossed over one another at a point a short distance below pin 85, as indicated at 87. Below said crossover, the two lower side portions 86b of the fork member engage snugly against opposite sides of a pointer actuating pin 90 projecting from a cylindrical member 91 which is mounted on the end of a resilient strap 92. Strap 92 is formed with a forwardly-extending resilient loop or fold 93, and then bent downwardly, as at 94, and passing through the downwardly-bent portion of the strap and fastened thereto is a sleeve or hub 95, which is pivotally mounted on a pivot screw 95a threaded into the upper end of a supporting bar 96 and secured by a jamb nut 97 (see Fig. 9). The lower end of supporting bar 96 is secured to a post 98 projecting from frame plate 15. Movement of cross bar 69 interconnecting the two bellows 91 with expansion of one of the bellows and contraction of the other effects pivotal movement of fork 86 on pivot screw 66 by reason of the engagement of pin 85 with the upper fork side portions 86, and such movement of the fork 86, the lower side portions 86b of which engage the pin 94 projecting from strap 92, swings strap 92 on pivot screw 95a. The amount of such pivotal movement imparted to strap 92, and hence to its hub 95, may be regulated by turning a screw 100 which is threaded through the member 91 and engages at its lower end against hub 95, it being evident that the adjustment of this screw regulates the position of pin 90 along the length of fork 86, and therefore the lever arm length and multiplying ratio of the fork. This adjustment is hence the sensitivity adjustment of the instrument. It will, of course, be understood that the resilient loop 93 in the member 92 is adapted to maintain the lower end of the adjustment screw 100 against hub 95 in all positions of adjustment of the screw. The strap 92 is continued downwardly somewhat below the sleeve 95 and then doubled back as indicated at 102, in order to provide a counter-weight for the portion of the strap above the sleeve, together with the parts carried thereby.

The depending portion 102 of strap 92 is also preferably utilized in conjunction with appropriate stops to prevent overmovement of the indicator mechanism, and is here shown to be engageable with stop lugs 104 bent forwardly from arms 105 projecting oppositely from post 98, on which they are mounted by the same screw employed to secure the supporting bar 96 to said post. A pointer 110 has at its hub a pin 111 frictionally fitted within the forward end portion of sleeve 95. Immediately to the rear of this pointer is the dial 115, being mounted on posts 116 projecting from the aforementioned straps 77 employed in the mounting of the bellows tubes 73.

Dial 115 may carry a conventional kerosene-filled bank indicating tube 120 containing an indicating element 121, as is conventional practice in modern bank and turn indicators. The bank indicator forming no part of the present invention, no detailed description thereof will be given.

The complete operation of the instrument may now be understood. Upon rotation of the instrument about the vertical axis, a precessional torque is developed about the precession axis, causing the gimbal ring to tend to rotate thereabout. Such movement of the gimbal ring acts through pin 60, link 64 and pin 68 to move the bellows interconnecting member 69 in a lateral direction, thereby compressing one of the bellows and extending the other, whereby liquid in the former is forced through the restricted orifice 18 to the latter. This liquid flow through the restricted orifice damps the action, and, the bellows being formed of metal and hence having considerable resiliency, the precessional action is yieldingly opposed by the bellows, which thus function as centralizing springs. Of course, if desired, the damping function and centralizing spring function might be separated, the bellows being simply in the nature of expansive and contractive chambers, and having no necessary resiliency or centralizing tendency, in which case additional spring centralizing means of some appropriate or conventional character would be required. It is one feature of the present invention, however, that the spring centralizing means and damping means may be combined in one simple and compact structure, and while the invention is not necessarily limited to reliance upon the expansive chambers or bellows as spring centralizing means, that arrangement is to be considered as a preferred form of the invention having advantages in point of simplicity and compactness over and above the alternative possibility in which the damping bellows do not have the centralizing function.

The described lateral movement of the bellows interconnecting bar effects movement of the pointer through the pin 85, the somewhat resilient fork member 86 and the pin carried by the pivotally mounted strap 92. The advantage of the resilient fork member 86 is that minor oscillations of the mechanism between the fork member 86 and the gimbal ring, not removed by the damping means, are absorbed by reason of the flexibility inherent in said fork member. The advantage of the crossed construction of the fork member 86 is that the upper and lower portions thereof hug the pins 85 and 90, respectively, more or less independently, thereby guarding against looseness or play at both connections. It will be observed that the pin engaging the fork member 86 is located somewhat closer to pivot screw 66 than is the pin 68 engaging the link 64, providing for amplified swing of the fork member 86 as compared with that of link 64. This amplified swing is transmitted, in a manner previously described, to the pointer 110 by way of the connection between the fork member and the pin 90 on strap 92, and as before described, the magnitude of swing of the pointer 110 is adjustable by means of the adjustment screw 100, which simultaneously increases the lever arm length of fork member 86 and decreases the effective lever arm length of strap 92, and vice versa.

The instrument as a whole is heavily damped, the observed action of the pointer being virtually "dead beat" in character. The mechanism is simple and compact, the centralizing spring effect being derived from the damping bellows, which results in considerable simplification. A further feature worthy of note is the particularly simple sensitivity adjustment provided.

It will of course be understood that the drawings and description are merely illustrative of, rather than restrictive, on the invention and that various changes in design, structure and arrangement may be made without departing from the spirit and scope of the invention or of the appended claims.

I claim:

1. In a gyroscopic instrument comprising a gimbal frame rotatable on a precession axis and a gyroscope rotor rotatable on said gimbal frame on an axis at right angles to the precession axis: means for damping said gimbal frame comprising a pair of hermetically sealed expansive and contractive liquid containing chambers interconnected by a restricted orifice, and means connecting said gimbal frame with said chambers in a manner to cause expansion of one of the chambers and contraction of the other for each direction of rotation of the gimbal frame on said precession axis.

2. In a gyroscopic instrument comprising a gimbal frame rotatable on a precession axis and a gyroscope rotor rotatable on said gimbal frame on an axis at right angles to the precession axis: means for damping and spring centralizing said gimbal frame comprising a pair of hermetically sealed expansive and contractive liquid containing resilient bellows interconnected by a restricted orifice, and means connecting said gimbal frame with said resilient bellows in a manner to cause expansion of one of the resilient bellows and contraction of the other for each direction of rotation of the gimbal frame about said precession axis from a predetermined centralized position.

3. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of hermetically sealed liquid containing bellows positioned in end to end opposition and secured at their remote ends to said relatively fixed frame, a restricted interconnecting liquid passageway between said bellows, and means operable by rotation of the gimbal frame on said precession axis for simultaneously effecting movement of the two proximate ends of said bellows in the same direction.

4. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of resilient hermetically sealed liquid containing bellows positioned in end to end opposition and secured at their remote ends to said relatively fixed frame, a restricted interconnecting liquid passageway between said bellows, and means operable by rotation of the gimbal frame on said precession axis for simultaneously effecting movement of the two proximate ends of said bellows in the same direction.

5. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of hermetically sealed liquid containing bellows positioned in end to end opposition and secured at their remote ends to said relatively fixed frame, means interconnecting the free proximate ends of said bellows, whereby each of said bellows is constrained to expand by virtue of contraction of the other, a restricted liquid passageway extending between said bellows, and an operative interconnection between the rotatable gimbal frame and the two opposed interconnected ends of the bellows.

6. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of hermetically sealed liquid containing bellows positioned in end to end opposition and secured at their remote ends to said relatively fixed frame, a bridge member tying together the free proximate ends of the two bellows, a restricted liquid passageway extending between said bellows, and an operative interconnection between said gimbal frame and said bridge member adapted to move said bridge member to expand and contract the bellows in accordance with rotation of the gimbal frame.

7. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of resilient hermetically sealed liquid containing bellows positioned in end to end opposition and secured at their remote ends to said relatively fixed frame, a bridge member tying together the free proximate ends of the two bellows, a restricted liquid passageway extending between said bellows, and an operative interconnection between said gimbal frame and said bridge member adapted to move said bridge member to expand and contract the bellows in accordance with rotation of the gimbal frame.

8. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of hermetically sealed liquid containing bellows positioned in end to end opposition and secured at their remote ends to said relatively fixed frame, a bridge member tying together the free proximate ends of the two bellows, a restricted liquid passageway extending through said bridge member between said bellows, and an operative interconnection between said gimbal frame and said bridge member adapted to move said bridge to expand and contract the bellows in accordance with rotation of the gimbal frame.

9. In a gyroscopic instrument comprising a gimbal frame rotatable on a precession axis and a gyroscope rotor rotatable on said gimbal frame on an axis at right angles to the precession axis: means for damping said gimbal frame comprising a pair of hermetically sealed expansive and contractive liquid containing chambers interconnected by a restricted orifice, means interconnecting said chambers with said gimbal frame in a manner to cause expansion of one of the chambers and contraction of the other for each direction of rotation of the gimbal frame on said precession axis, and a third chamber in liquid communication with one of said other chambers.

10. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of resilient hermetically sealed liquid-containing bellows spaced from one another in end to end opposition on a common longitudinal axis and secured at their remote ends to said relatively fixed frame, a bridge member interconnecting the proximate ends of said bellows, a restricted liquid passageway interconnecting the interiors of the two bellows, a pivoted arm located between said bellows and provided with an operative connection with said bridge member adapted to move said bridge member and the proximate ends of the bellows in a direction parallel to the longitudinal axis of the bellows, and an operative connection between said arm and said rotatable gimbal frame.

11. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of resilient hermetically sealed liquid-containing bellows spaced from one another in end to end opposition on a common longitudinal axis and secured at their remote ends to said relatively fixed frame, a bridge member interconnecting the proximate ends of said bellows, a restricted liquid passageway interconnecting the interiors of the two bellows, a pivoted arm located between said bellows and provided with an operative connection with said bridge member adapted to move said bridge member and the proximate ends of the bellows in a direction parallel to the longitudinal axis of the bellows, and an operative connection between said arm and said rotatable gimbal frame, including a pin projecting from said gimbal frame from a point offset from said precession axis into operative association with said pivoted arm.

12. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of resilient hermetically sealed liquid-containing bellows spaced from one another in end to end opposition on a common longitudinal axis and secured at their remote ends to said relatively fixed frame, a bridge member interconnecting the proximate ends of said bellows, a restricted liquid passageway interconnecting the interiors of the two bellows, a pivoted two-sided arm located between said bellows, a pin projecting from said bridge member between the two sides of said arm, and a pin projecting from said gimbal frame from a point offset from said precession axis and received between the two sides of said pivoted arm.

13. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of resilient hermetically sealed liquid-containing bellows spaced from one another in end to end opposition on a common longitudinal axis and secured at their remote ends to said relatively fixed frame, a bridge member interconnecting the proximate ends of said bellows, a restricted liquid passageway interconnecting the interiors of the two bellows, a pivoted two-sided arm located between said bellows, a pin projecting from said bridge member between the two sides of said arm, and a pin projecting from said gimbal frame from a point offset from said precession axis and received between the two sides of said pivoted arm, and indicator mechanism driven from said bridge member, including a pivoted resilient arm having an operative connection with said bridge member, and a pivoted pointer driven by said resilient arm.

14. In a gyroscopic instrument comprising a relatively fixed frame, a gimbal frame rotatable on said relatively fixed frame on a precession axis, and a gyroscope rotor rotatable on said gimbal frame on an axis at right angles to the precession axis: a pair of resilient hermetically sealed liquid-containing bellows spaced from one another in end to end opposition on a common longitudinal axis and secured at their remote ends to said relatively fixed frame, a bridge member interconnecting the proximate ends of said bellows, a restricted liquid passageway interconnecting the interiors of the two bellows, a pivoted two-sided arm located between said bellows, a pin projecting from said bridge member between the two sides of said arm, and a pin projecting from said gimbal frame from a point offset from said precession axis and received between the two sides of said pivoted arm, and indicator mechanism driven from said bridge member, including a pivoted resilient two-sided arm, a pin projecting from said bridge member and received between the two sides of said pivoted arm, and a pivoted pointer driven by said resilient arm.

LEO NEVIN SCHWIEN.